Nov. 10, 1931.  H. C. LEESEBERG  1,831,671
VOLUMETRIC DISPLACEMENT METER
Filed April 24, 1929   5 Sheets-Sheet 2
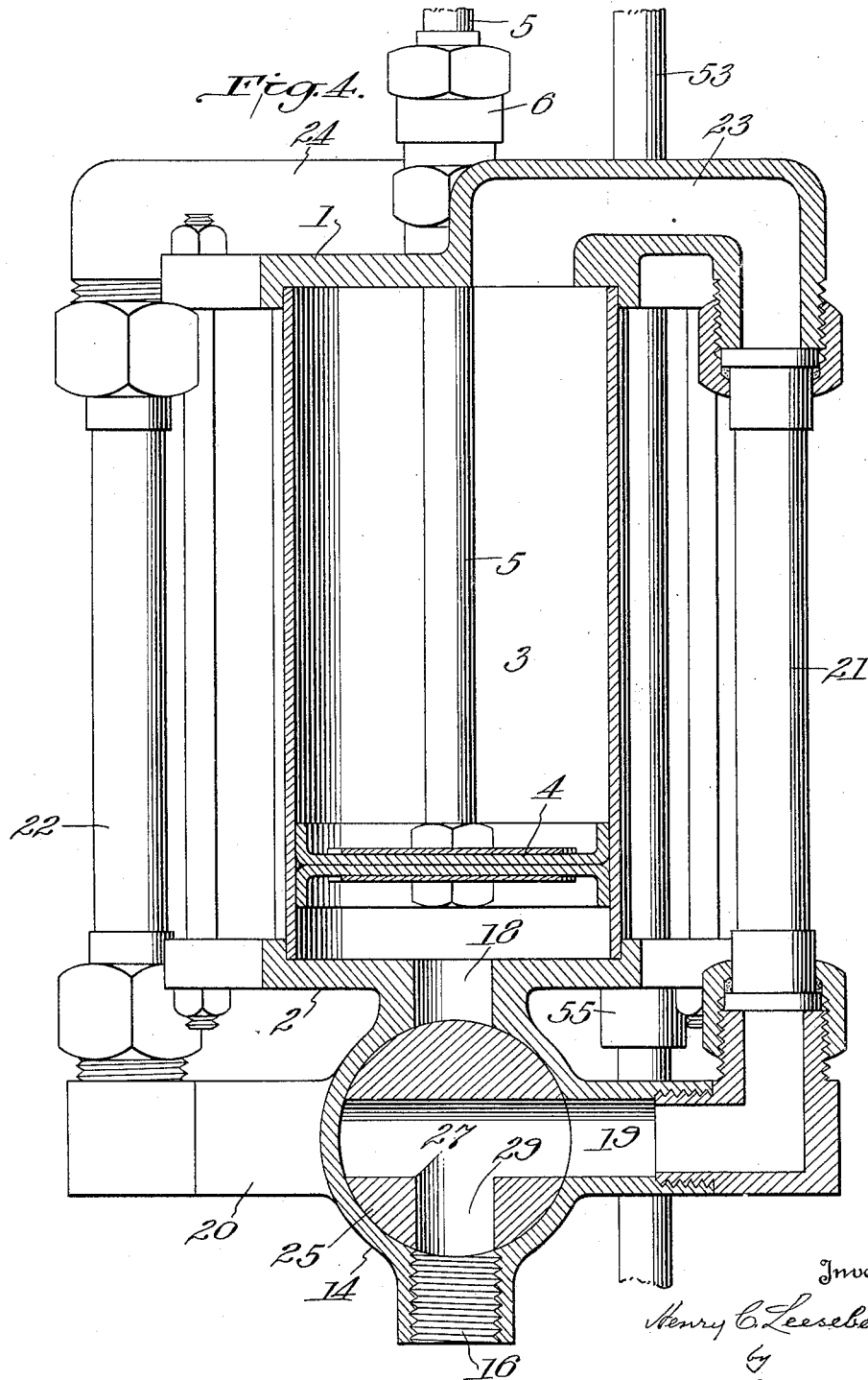

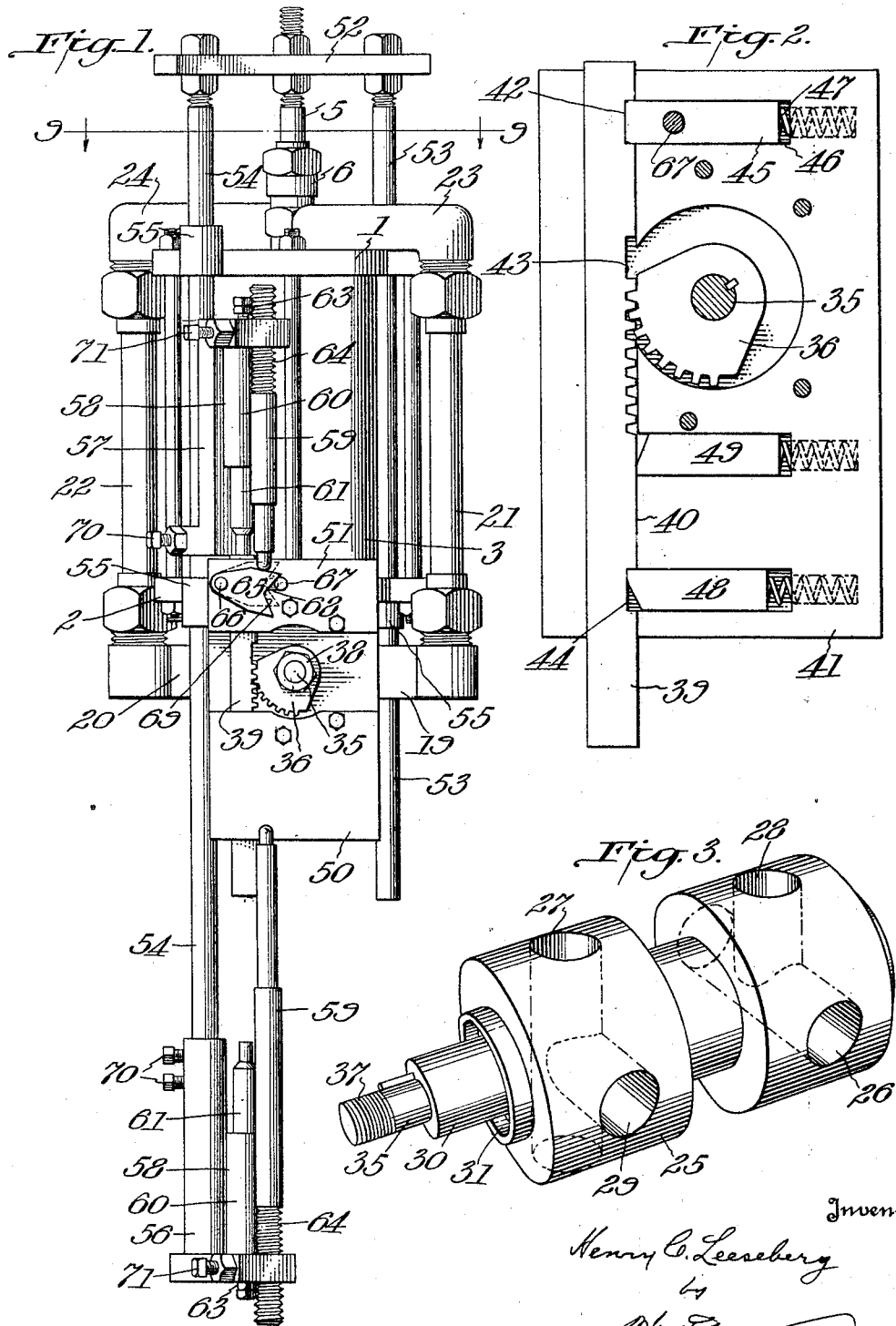

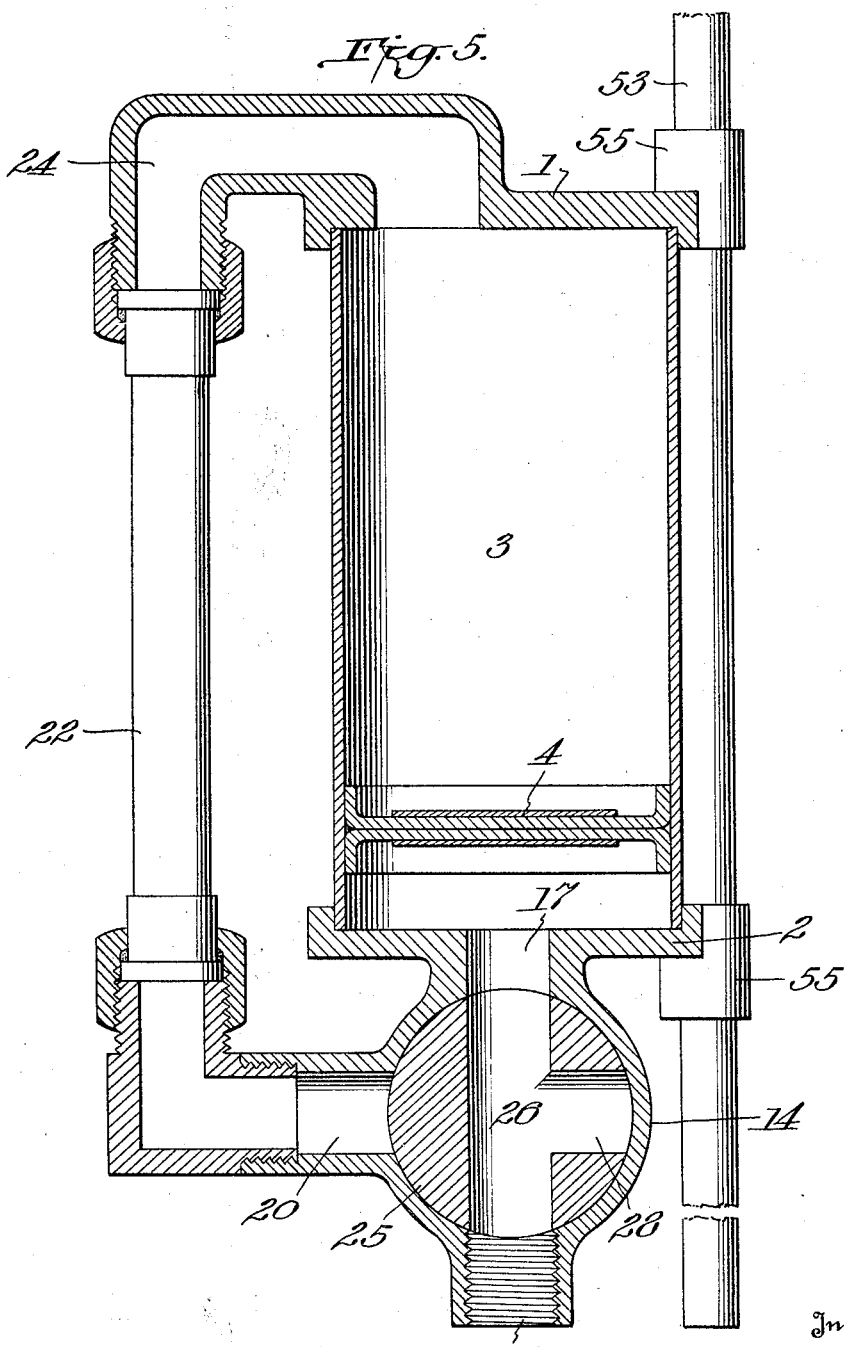

Nov. 10, 1931.  H. C. LEESEBERG  1,831,671
VOLUMETRIC DISPLACEMENT METER
Filed April 24, 1929  5 Sheets-Sheet 4
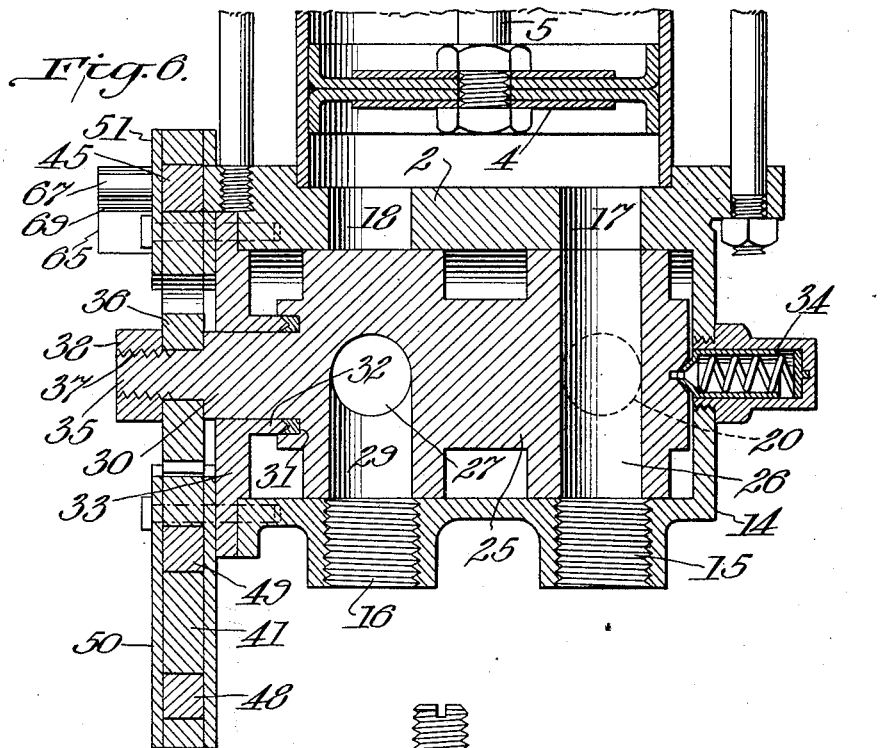
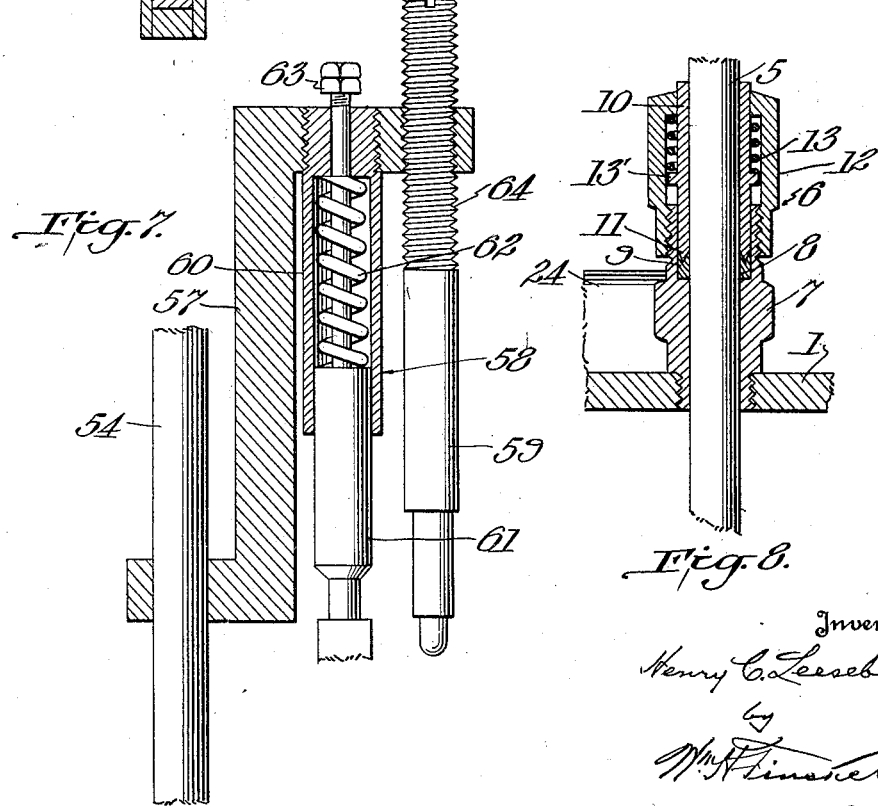
Inventor
Henry C. Leeseberg
by
Attorney

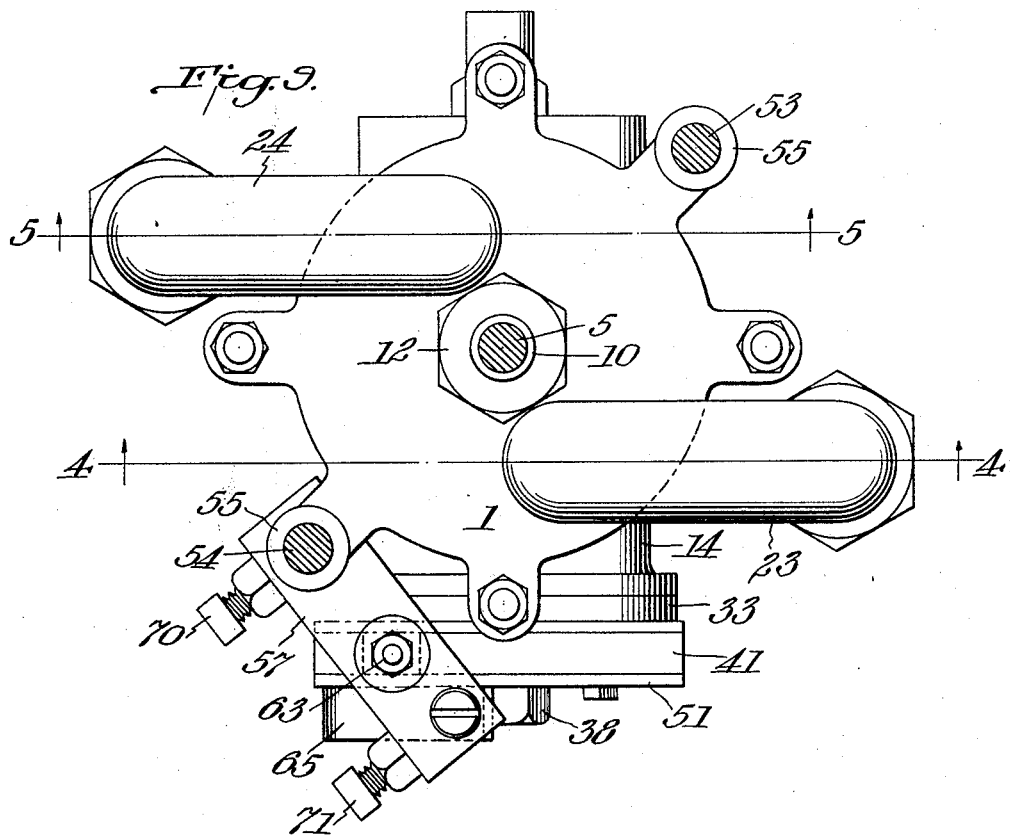

Patented Nov. 10, 1931

1,831,671

UNITED STATES PATENT OFFICE

HENRY C. LEESEBERG, OF FOSTORIA, OHIO, ASSIGNOR TO CHESTER A. PIERCE AND STANLEY E. McFARREN, BOTH OF AKRON, OHIO

VOLUMETRIC DISPLACEMENT METER

Application filed April 24, 1929. Serial No. 357,758.

This invention relates to volumetric displacement meters, that is, devices for the measuring of fluids by volume by intermittent displacement of a predetermined volumetric quantity.

One object of the invention is to provide a device of this character primarily for the measurement, by volume, of such liquids as gasoline and oil, although it is, of course, capable of being employed in the measuring of other liquids or fluids which may be supplied to it under pressure.

Another object of the invention is to provide in a device of this character, means, specifically a valve, of multiway formation which functions to completely control the operation of the device in response to movement of a fluid displacing member of the device under the influence of the fluid supplied thereto under pressure. An advantage of a valve of this character including, in a unit, all of the passageways necessary to the control and transfer of the fluid to be measured, is the elimination of the multiplicity of parts designed to control these various functions in apparatus of this general character as now commonly constructed and with which I am familiar.

The invention contemplates a volumetric displacement meter having a chamber, preferably in the form of a cylinder, provided with a displacing member or piston, a valve casing associated with the chamber or cylinder and provided with a plurality of ports affording communication between both ends of the chamber or cylinder with fluid supply and discharge means, this casing containing valve mechanism adapted to control the several ports of the casing and being so operatively connected with the displacing member or piston as to respond to the movement thereof to control a fluid under pressure, whereby such fluid may be fed to and discharged from the cylinder alternately at opposite ends thereof. The cylinder, being designed so as to have a predetermined volume, the reciprocation of the piston therein as the cylinder is filled alternately at opposite ends and consequently at opposite sides of said piston, will discharge the fluid from the cylinder in a substantially constant flow in predetermined volumetric quantities. The invention contemplates further, various details of construction whereby the action of the displacing member or piston may be controlled to vary the quantity of fluid displaced and whereby the efficiency of the device is enhanced, as I will proceed now to explain and finally claim.

In the accompanying drawings illustrating the invention, in the several figures of which like parts are similarly designated, Figure 1 is a front elevation of a device embodying the features of my invention. Fig. 2 is a sectional elevation of a portion of the valve actuating means. Fig. 3 is a perspective view of one suitable form of valve. Fig. 4 is a fragmentary transverse vertical sectional elevation taken on the line 4—4 of Fig. 9. Fig. 5 is a fragmentary transverse vertical sectional elevation taken on the line 5—5 of Fig. 9. Fig. 6 is a fragmentary vertical axial section through the valve and associated parts. Fig. 7 is a vertical sectional elevation of a portion of the valve operating mechanism. Fig. 8 is a section illustrating the piston rod packing. Fig. 9 is a section taken in the plane of line 9—9, Fig. 1 and looking down upon the top of the device.

The device comprises a top header 1 and a bottom header 2 between which headers is clamped in fluid-tight condition a cylinder 3 providing a chamber of predetermined volume provided with a piston or displacing member 4 preferably of ordinary pump piston type, as shown, and having a piston rod 5 extending upwardly through the top header 1 where it passes through a suitable packing gland 6. This gland comprises, in its preferred form (Fig. 8), a gland member 7 interiorly bored as at 8 to receive a packing material 9 pressed upon by a sleeve 10 having a conical lower end 11 which forces the packing material 9 into intimate engagement with the rod 5 under the influence of a gland nut 12 carrying a spring 13 which bears upon a shoulder 13' formed on the sleeve 10.

The bottom header 2 is provided with a preferably integrally formed valve casing 14 having an inlet port 15 and an outlet port 16 for the fluid to be measured, and with ports 17 and 18, preferably in vertical alignment with the ports 15 and 16 respectively and affording communication with the lower end of the cylinder 3. The casing is also provided with lateral ports 19 and 20 communicating through connecting tubes 21 and 22, respectively, with cored passageways 23 and 24, respectively, opening into the upper end of the cylinder 3 through header 1.

Within the valve casing, in the embodiment of the invention shown, which is the preferred embodiment, I mount a rotary cylindrical valve 25 (see particularly Fig. 3) having formed in it diametrical passageways 26 and 27 and communicating radial passageways 28 and 29 which join the passageways 26 and 27, respectively, and are arranged at an angle of 90° thereto. The passageways 26 and 28 have their axes in a plane coincident with the axes of the ports 15, 17 and 20, and the passageways 27 and 29 have their axes in a plane coincident with the axes of the ports 16, 18 and 19. It will be seen that the valve 25 will thus control, through its passageways 26 and 28 communication between the ports 15, 17 and 20, and through its passageways 27 and 29 communication between the ports 16, 18 and 19. Consequently, by a proper partial rotation of the valve 25, specifically a rotation through an angle of 90°, clockwise, as viewed in Figs. 1, 2, 4 and 5, the fluid admitted through port 15 may be introduced into and discharged from either the top or bottom of the cylinder 3 relatively to the piston 4, as will be hereinafter described more in detail.

In order that the valve may be partially rotated, as required for the proper operation of the device, I provide it with a stem 30 extending through a packing gland similar to the gland 6. This gland comprises a recess 31 surrounding the stem 30, to receive the packing material, and a sleeve 32 carried by the end plate 33 of the casing 14. The valve is forced toward the end plate 33 by a spring-pressed centering member 34, whereby the packing material is compressed in the recess 31 and against stem 30 and the valve itself held substantially in floating rotative position within the casing 14. The stem 30 is provided with a reduced keyed extension 35 to receive a splined segmental gear 36 by which the valve may be rotated, the extension 35 being threaded, as shown at 37, Figs. 3 and 6, to receive a jam nut 38 to hold the gear in place. This gear 36 meshes with the teeth of a rack bar 39, see particularly Fig. 2 arranged for vertical sliding movement in a guide recess or channel 40 formed in a plate 41 secured to the bottom header 2 and casing 14.

The rack bar 39 is provided with three notches 42, 43 and 44. Two of these notches, namely 42 and 43 are adapted to be engaged by a shiftable latch or key 45 slidable in a suitable recess 46 in the plate 41 and normally forced toward the rack bar by a spring 47. The other notch, 44, is engaged alternately by the spring-pressed dogs 48 and 49 arranged in the plate 41 and provided with bevelled ends so that they may automatically engage with and be disengaged from the notch 44, as will hereinafter be explained. A face plate or plates 50, 51 secured in contact with the plate 41 are provided for holding the rack bar 39 key 45 and dogs 48 and 49 and their adjuncts in proper operative relation.

Carried by the piston rod 5 adjacent to its end, and adjustable thereon, as shown, is a yoke 52 to which are connected two rods 53 and 54 guided in ears 55 formed on the headers 1 and 2. The rod 53 is merely a guide rod, but the rod 54 has adjustably applied to it bracket members 56 and 57 which carry the elements for operating the rack bar 39 and its associated parts and hence the valve 25.

These elements comprise a ram 58 and a trip pin 59 for each bracket. The rams 58, as shown in detail in Fig. 7, comprise, preferably, sleeves 60 suitably secured in the bracket members, and plungers 61 slidable in the sleeves and backed up by relatively stiff springs 62. Stop members 63 carried by the plungers limit their outward movement under the influence of the springs 62. The trip pins 59 are adjustable in the brackets by means of their threaded ends 64.

The plungers 61 of the rams 58 are axially aligned with the rack bar 39 and operate same in a manner later described, and the trip pins 59 are so arranged as to strike against the opposite faces of a cam lever 65 pivoted on the face plate 51 at 66 in horizontal alignment with a latch pin 67 carried by the latch or key 45 and slidable in a slot 68 in plate 51. The cam lever 65 has a V-shaped cam face 69 at its free end and this cam face cooperates with the latch pin 67 to move the latch or key 45 out of engagement with the notches 42 and 43 when the lever 65 is moved by cooperation therewith of the trip pins 59, as hereinafter explained more in detail.

Suitable set screws 70 are provided for securing the adjustment of the brackets 56 and 57 upon rod 54, and similar set screws 71 maintain the adjustment of the trip pins 59.

Any suitable registering or recording device, not shown, may be operated by any appropriate moving part of the apparatus, such as cross-head 52, piston rod 5 or guide rod 53 for providing a visible indication of the quantity of fluid measured by the device. For example, if the volume of the chamber formed by cylinder 3 is approximately one-half gallon, a complete reciprocation of the piston (up and down), as determined by adjustment of the pins 59, will displace one gallon or 231 cubic inches (U. S.) of fluid, and a register or recorder could therefore be appropriately operated by any one of the reciprocating parts 52, 5 or 53, mentioned, or by other parts.

Assuming that the port 15 of casing 14 is connected with a valve-controlled supply of fluid under pressure, gasoline, for example, and port 16 is connected with a point of delivery, the fuel tank of an automobile, for example, and that the valve 25 and its operating mechanism are in the position shown in Figs. 1, 2, 4, 5 and 6 of the drawings, and that the portion of cylinder 3 above its piston 4 is filled with gasoline, the operation of the device will be substantially as follows:—

When the valve controlling the supply of gasoline under pressure is opened, the gasoline will pass through port 15, passageway 26 and port 17 into the lower end of cylinder 3 and below piston 4. The pressure exerted by the gasoline will raise piston 4 and cause it to force the gasoline out of the upper portion of cylinder 3 into passage 23 and tube 21 and thence through port 19, passageways 27 and 29 and port 16 to the fuel tank of the automobile. As the piston 4 rises, it forces up the piston rod 5, cross-head 52 and parts carried thereby. Thus the ram 58 carried by the bracket 56 will be raised and its plunger 61 will contact with the lower end of the rack bar 39. Meantime, pin 59 of bracket 57 will have moved away from lever 65 and key 45 will have entered notch 42, as shown in Fig. 2. lever 65 assuming the position shown in dotted lines, Fig. 1. Therefore, as the rack bar is held against vertical movement by the latch or key 45, the plunger 61 will be moved into its sleeve 60, thereby compressing its spring 62. The continued rise of the bracket 56 will bring the end of the trip pin 59 carried thereby into engagement with the lower edge of the cam lever 65 and will move the cam lever upwardly about its pivot 66, so that the lower half of its cam face 69 will move latch pin 67 and with it latch 45 out of engagement with notch 42. Immediately upon disengagement of latch 45 from notch 42 the energy stored in spring 62 of ram 58 carried by bracket 56 will cause its plunger 61 to move quickly upward, thus moving the rack bar 39 to its uppermost position, as determined by engagement of dog 49 with notch 44 of the rack bar and will, through the cooperation of the rack teeth with segmental gear 36 quickly rotate valve 25 through an angle of 90°, clockwise, to a position at 180° from that shown in Fig. 3, thereby changing the position of its passageways 26, 27, 28 and 29 relatively to their aligned casing ports 15, 16, 17, 18, 19 and 20. With the valve in this second position, it will be apparent that passageway 26 is in alignment with port 20, and passageway 28 is in alignment with port 15. Also passageway 27 is in alignment with ports 16 and 18, and passageway 29 is closed against the side of the casing 14.

Immediately upon the registering of passageways 26 and 28 with ports 20 and 15, respectively, the gasoline under pressure will rise through tube 22 and passage 24 into the upper portion of cylinder 3 wherein the piston 4 is now in its upper position and in substantially the same relation to header 1 as it is shown in relation to header 2 in its down position. The pressure of the gasoline will force the piston down and the gasoline contained in the cylinder 3 below the piston will be forced directly through port 18, passageway 27 and port 16 to the fuel tank of the automobile.

As the piston travels downward, its piston rod 5 will carry with it the cross-head 52 and the mechanism carried thereby, plunger 61 of ram 58 carried by bracket 57 will be forced into its sleeve 60, thus compressing its spring 62, the rack bar 39 being held against movement by latch 45, until trip pin 59 carried by bracket 57 engages with cam lever 65 and pushes it down to release latch 45, whereupon the rack bar will be immediately forced downward under the influence of plunger 61, and the valve 25, through the instrumentality of the rack teeth and segmental gear 36 will be returned to its former position, its movement being limited by engagement of dog 48 with notch 44.

Obviously, this automatic operation of the device will continue so long as the valve controlling the feed of gasoline under pressure to inlet port 15 remains open, and gasoline will be fed in a substantially continuous stream from outlet port 16 to the fuel tank.

As hereinbefore explained, upward movement of the rack bar 39 is limited by automatic engagement of dog 49 with notch 44, and its downward movement is limited by engagement of dog 48 with notch 44, thus limiting the rotative movement of the valve to a 90° oscillation alternately clockwise and counter-clockwise, and ensuring the exact registry of its passageways with the several ports of the valve casing 14.

As will be apparent from an inspection of Fig. 2, the dogs 48 and 49 offer no resistance to movement of the rack bar up and down, respectively, under the influence of the pins 59 of brackets 56 and 57, respectively, for the reason that they are provided with bevelled notch-engaging faces which cause them to cam out of notch 44 against the pressure of their springs.

Obviously, as hereinbefore indicated, initial movement of the piston in either direction carries with it the cross-head 52 and the mechanism carried thereby and thus the trip pin 59 which has been for the time-being in engagement with the cam lever 65 will move away from it and permit the pin 67 to return it to the dotted line position of Fig. 1, thus allowing the latch or key 45 to engage with either notch 42 or notch 43, depending upon whether the rack bar is in its lowered or raised position, respectively, the limiting action of the dogs 48 and 49 causing the notches 42 and 43 to register with key 45.

If, after preliminary or test adjustment of the trip pins 59 in their brackets 56 and 57, it is found that the device is not discharging the proper volumetric quantity of fluid, they may be adjusted until the proper quantity is delivered, it being apparent that when these pins trip the lever 65 and permit the valve to rotate, the piston 4 will be arrested and started on its return movement, thus determining the quantity of fluid displaced by it. In other words, the trip pins 59 not only determine the time of operation of the valve relatively to the stroke of the piston, but determine the quantity of fluid displaced by the piston as well.

I have hereinbefore referred to the action of the spring-pressed center 34 in forcing the valve 25 in the direction to compress the packing material within the groove 31. I have found that the only tendency for leakage of fluid from the device is around the stem 30 of the valve 25 and around the piston rod, and the form of packing shown around these parts is adequate for prevention of such leakage. In addition to preventing leakage around the stem 30, the arrangement of the spring-pressed center forms a pivot bearing for one end of the valve 25 and such bearing makes it possible to provide a relatively loose fit of the valve within its casing, whereby sticking of same is obviated and the operation of the valve made easier. It is immaterial what leakage of gasoline or other fluid measured there may occur within the valve chamber so long as it is not lost from the valve chamber, and hence a loose fit of the valve, that is to say a good easy rotative fit, which does not entirely prevent leakage around the valve does not in any way interfere with the efficient operation of the device.

Various changes are contemplated as within the spirit of the invention and the scope of the following claims.

What I claim is:—

1. In a volumetric displacement meter, means defining a chamber of predetermined volume, a displacement member movable within said chamber and adapted to discharge therefrom a predetermined quantity of fluid, means through which fluid is introduced into said chamber at opposite ends thereof, means distinct from said introducing means through which said fluid is discharged from opposite ends thereof, and means for controlling the introduction into and discharge of said fluid from said chamber including a valve casing provided with an inlet port and an outlet port and ports affording communication through said separate fluid introducing and discharging means with both ends of said chamber and a valve member arranged in said casing and controlling all of said ports simultaneously.

2. In a volumetric displacement meter, means defining a chamber of predetermined volume, a displacement member movable within said chamber and adapted to discharge therefrom a predetermined quantity of fluid, means through which fluid is introduced into said chamber at opposite ends thereof, means distinct from said introducing means through which said fluid is discharged from opposite ends thereof, and means for controlling the introduction into and discharge of said fluid from said chamber including a valve casing provided with an inlet port and an outlet port and ports affording communication through said separate fluid introducing and discharging means with both ends of said chamber and a valve member arranged in said casing and provided with a plurality of passageways for controlling all of said ports simultaneously.

3. In a volumetric displacement meter, means defining a chamber of predetermined volume, a displacement member movable within said chamber and adapted to discharge therefrom a predetermined quantity of fluid, means through which fluid is introduced into said chamber at opposite ends thereof, means distinct from said introducing means through which said fluid is discharged from opposite ends thereof, and means for controlling the introduction into and discharge of said fluid from said chamber including a valve casing provided with an inlet port and an outlet port and ports affording communication through said separate fluid introducing and discharging means with both ends of said chamber and a rotary valve member arranged in said casing and controlling all of said ports simultaneously.

4. In a volumetric displacement meter, means defining a chamber of predetermined volume, a displacement member movable within said chamber and adapted to discharge therefrom a predetermined quantity of fluid, means through which fluid is introduced into said chamber at opposite ends thereof, means distinct from said introducing means through which said fluid is discharged from opposite ends thereof, a valve casing having an inlet port, an outlet port and ports affording communication through said separate fluid introducing and discharging means with the opposite ends of said chamber, a valve arranged in said casing and provided with passageways for controlling all of said ports simultaneously, and means operated by said displacement member for operating said valve.

5. In a volumetric displacement meter, means defining a chamber of predetermined volume, a displacement member movable within said chamber and adapted to discharge therefrom a predetermined quantity of fluid, means through which fluid is introduced into said chamber at opposite ends thereof, means distinct from said introducing means through which said fluid is discharged from opposite ends thereof, a valve casing having an inlet port, an outlet port and ports affording communication through said separate fluid introducing and discharging means with the opposite ends of said chamber, a rotary valve arranged in said casing and provided with a plurality of passageways for controlling said ports, and means operated by said displacement member for rotating said valve to change the registering relation of said passageways to said ports.

6. In a volumetric displacement meter, means defining a chamber of predetermined volume, a displacement member movable within said chamber and adapted to discharge therefrom a predetermined quantity of fluid, means through which fluid is introduced into said chamber at opposite ends thereof, means distinct from said introducing means through which said fluid is discharged from opposite ends thereof, means including a valve and movement limiting means therefor for controlling the introduction into and discharge of fluid from both ends of said chamber, said displacement member being moved by the fluid introduced, and means operated by said displacement member for operating said valve to alternately permit introduction of fluid into the two ends of said chamber and thereby limit the travel of the displacement member, said valve remaining at rest during displacement movement of said member.

7. In a volumetric displacement meter, a cylinder of predetermined volume, a piston movable longitudinally within said cylinder, separate means connecting each end of said cylinder with a supply of fluid under pressure, separate means for connecting each end of said cylinder with a discharge for said fluid, said piston being moved by the influence of the pressure fluid thereon, a valve for controlling the admission to and discharge of the fluid from both ends of said cylinder, means for limiting movement of said valve, and means operated by said piston for operating said valve to admit the pressure fluid alternately to the opposite ends of the cylinder, said valve remaining at rest during displacement movement of the piston, the time of operation of said valve relatively to the position of the piston within the cylinder determining the stroke of said piston.

8. In a volumetric displacement meter, a cylinder of predetermined volume, a piston movable longitudinally of said cylinder, a valve casing associated with said cylinder and provided with an inlet port for a fluid under pressure and an outlet port for said fluid, means including a multi-passaged rotary valve for establishing communication between the ends respectively of said cylinder and said inlet port and outlet port whereby fluid may be introduced into and discharged from the opposite ends of said cylinder alternately, said piston being reciprocated in said cylinder by said pressure fluid, and means for operating said valve in timed relation to the reciprocation of said piston including intermeshing rack and gear mechanism, means carried by and movable with said piston for reciprocating said rack, means for holding said rack against movement during a predetermined travel of said piston, and means comprising an adjustable trip pin carried by and movable with said piston for releasing said rack-holding means, variation in adjustment of said trip pin varying the time of operation of said rack and hence of said valve to thereby vary the stroke of said piston.

9. In a volumetric displacement meter, a cylinder of predetermined volume, a piston reciprocable in said cylinder and provided with a piston rod extending exteriorly of the cylinder, means including a ported valve casing and a rotary valve therein for controlling communication between the respective ends of said cylinder and a source of supply of fluid under pressure and a discharge for such fluid, means for imparting rotary movement to said valve including a gear carried by said valve and a rack bar having teeth in mesh with said gear, a latch for holding said rack bar against movement, means carried by and movable with said piston rod for imparting movement to said rack bar and including spring rams having plungers depressible upon contact with the ends of said rack bar to compress their springs, a cam lever cooperating with said latch, and means movable with said piston and cooperating with said cam lever for releasing said latch to thereby permit the ram plungers to move said rack bar and through it said valve in timed relation to the reciprocation of said piston.

10. In a volumetric displacement meter, a cylinder of predetermined volume, a piston reciprocable in said cylinder and provided with a piston rod extending exteriorly of the cylinder, means including a ported valve casing and a rotary valve therein for controlling communication between the respective ends of said cylinder and a source of supply of fluid under pressure and a discharge for such fluid, means for imparting rotary movement to said valve including a gear carried by said valve and a rack bar having teeth in mesh with said gear, a latch for holding said rack bar against movement, means carried by and movable with said piston rod for imparting movement to said rack bar and including spring rams having plungers depressible upon contact with the ends of said rack bar to compress their springs, a cam lever cooperating with said latch, means movable with said piston and cooperating with said cam lever for releasing said latch to thereby permit the ram plungers to move said rack bar and through it said valve in timed relation to the reciprocation of said piston, and means for limiting the movement of said rack bar and hence of said valve.

In testimony whereof I have hereunto set my hand this 22nd day of April, A. D. 1929.

HENRY C. LEESEBERG.